United States Patent
Jang et al.

(10) Patent No.: US 11,041,837 B2
(45) Date of Patent: Jun. 22, 2021

(54) METHOD AND KIT FOR DETERMINING PERACETIC ACID CONCENTRATION IN DISINFECTANT SOLUTIONS

(71) Applicant: LONZA, LLC, Morristown, NJ (US)

(72) Inventors: Steven Jang, Cumming, GA (US);
Richard E. Brien, Cumming, GA (US);
Kaifeng Lu, Shanghai (CN);
Yongcheng Ji, Ridgefield, CT (US)

(73) Assignee: LONZA, LLC, Morristown, NJ (US)

( * ) Notice: Subject to any disclaimer, the term of this patent is extended or adjusted under 35 U.S.C. 154(b) by 159 days.

(21) Appl. No.: 16/318,148

(22) PCT Filed: Jul. 20, 2017

(86) PCT No.: PCT/US2017/043031
§ 371 (c)(1),
(2) Date: Jan. 16, 2019

(87) PCT Pub. No.: WO2018/017809
PCT Pub. Date: Jan. 25, 2018

(65) Prior Publication Data
US 2019/0302071 A1    Oct. 3, 2019

Related U.S. Application Data

(60) Provisional application No. 62/364,947, filed on Jul. 21, 2016.

(51) Int. Cl.
*G01N 31/22*    (2006.01)
*G01N 21/78*    (2006.01)
*A01N 37/16*    (2006.01)

(52) U.S. Cl.
CPC ............. *G01N 31/22* (2013.01); *A01N 37/16* (2013.01); *G01N 21/78* (2013.01)

(58) Field of Classification Search
CPC ........ A01N 37/16; A01N 25/00; G01N 31/22; G01N 21/77; G01N 21/78; Y10T 436/201666; Y10T 436/206664
(Continued)

(56) References Cited

U.S. PATENT DOCUMENTS 3,183,173 A    5/1965   Oakes
3,235,337 A    2/1966   Artis
(Continued)

FOREIGN PATENT DOCUMENTS

EP         0916946        5/1999
WO    WO 1992/22806     12/1992
WO    WO 2016/064792    4/2016

OTHER PUBLICATIONS

PCT/US2017/043031 Search Report and Written Opinion dated Sep. 15, 2017.
(Continued)

*Primary Examiner* — Maureen Wallenhorst
(74) *Attorney, Agent, or Firm* — Dority & Manning, P.A.

(57) ABSTRACT

A kit and method for accurately determining the concentration levels of peracetic acid in a solution containing a peroxide or other oxidant is disclosed. In order to determine the concentration of peracetic acid in the solution, a pH buffer system is used to deactivate high levels of a peroxide in a disinfectant solution without interfering with active peracetic acid levels in the solution. At least one test strip is used to measure the peracetic acid concentration in the solution. A test vial for combining the solution with the pH buffer prior to contact with the test strip is provided.

9 Claims, 2 Drawing Sheets

(58) Field of Classification Search
USPC ........ 436/129, 135, 163, 164, 169; 422/400, 422/420, 430
See application file for complete search history.

(56) References Cited

U.S. PATENT DOCUMENTS

| | | | | |
|---|---|---|---|---|
| 3,770,381 | A | * | 11/1973 | Schmitt .................... C12Q 1/28 435/28 |
| 4,900,682 | A | | 2/1990 | Fischer et al. |
| 5,906,919 | A | | 5/1999 | Garini et al. |
| 5,939,328 | A | | 8/1999 | Fischer et al. |
| 6,087,089 | A | | 7/2000 | Wu |
| 2002/0131890 | A1 | * | 9/2002 | Huth ........................ A61L 2/28 422/28 |
| 2003/0211169 | A1 | | 11/2003 | Tabasso |
| 2006/0134795 | A1 | * | 6/2006 | Howarth ............ G01N 33/1826 436/100 |
| 2009/0047176 | A1 | * | 2/2009 | Cregger .................... A61L 2/28 422/28 |
| 2013/0259957 | A1 | | 10/2013 | Dagher et al. |
| 2020/0049630 | A1 | * | 2/2020 | Mali ...................... G01N 21/78 |

OTHER PUBLICATIONS

Rutala et al: Comparative evaluation of the sporicidal activity of new low-temperature sterilization technologies: Ethylene oxide, 2 plasma sterilization systems, and liquid peracetic acid, American Journal of Infection Cont, C.V. Mosby Co., St. Louis, MO, US, vol. 26, No. 4, Aug. 1, 1998, pp. 393-398.

Micro Essential Laboratory Inc.: Hydrion Peracetic Acid (PAA) Test Strips, 0-160 PPM, data sheet, 2013, 2 pages.

Minntech Corporation: "Perassay 500 peracetic acid test strips-78378-000", Jan. 1, 2010 XP055403937, Retrieved from the Internet: URL:http://www.medivators.com/sites/default/files/minntech/documents/Perassay_500IFU.pdf. retrieved on Sep. 5, 2017.

Davies et al., Determination of Peracids in the Presence of a Large Excess of Hydrogen Peroxide Using A Rapid and Convenient Spectrophotometric Method,, Analyst, Sep. 1998, vol. 113. pp. 1477-1479, Published Jan. 1, 1988. Downloaded by Clemson University on May 13, 2016.

QUANTOFIX® Peracetic acid 500, Macherey-Nagel, Product data sheet, Rev. Jun. 2014, 1 page, 2014.

QUANTOFIX® Peracetic acid 500 test strips, Machinery-Nagel, Product data sheet, May 24, 2016, 1 page.

* cited by examiner

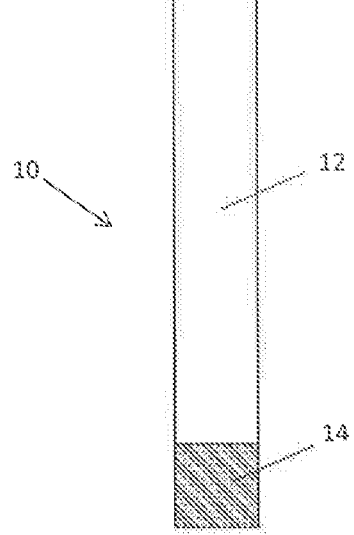
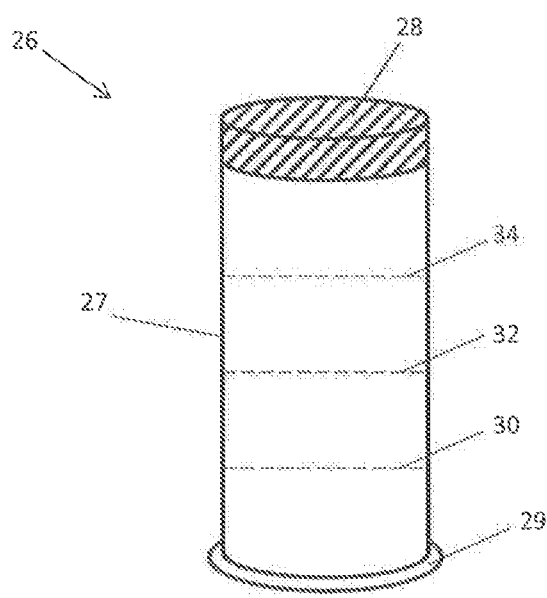
FIG. 1
FIG. 2

METHOD AND KIT FOR DETERMINING PERACETIC ACID CONCENTRATION IN DISINFECTANT SOLUTIONS

CROSS REFERENCE TO RELATED APPLICATIONS

This application is the U.S. National Stage entry of International Application Number PCT/US2017/043031 filed under the Patent Cooperation Treaty and having a filing date of Jul. 20, 2017, which claims priority to U.S. Provisional Application No. 62/364,947 having a filing date of Jul. 21, 2016, all of which are hereby incorporated by reference herein in their entirety for all purposes.

BACKGROUND

Peracetic acid is a very effective oxidizer and therefore is commonly used in many disinfectant products. Disinfectant products containing peracetic acid typically contain other oxidizers and disinfectants. For instance, such products can also contain quaternary compounds, a peroxide such as hydrogen peroxide, and water. These products and solutions have many different uses and applications. For example, disinfectant products containing peracetic acid are commonly used to sterilize surfaces and objects, such as medical devices and equipment. A disinfectant product containing peracetic acid in combination with a peroxide, for instance, is not only very effective in sterilizing surfaces and objects, but is also relatively inexpensive, convenient to use, and effective as a sanitizer or disinfectant in relatively low concentrations.

Disinfectant products are typically sold in a concentrate form. The products are then diluted prior to use. Consequently, the potency level of the peracetic acid in the final solution can vary depending upon the amount the original product is diluted.

Monitoring peracetic acid levels in disinfectant products is important in certain applications to ensure that the disinfectant product is being used efficiently for properly sanitizing a surface or object. In this regard, it is known to periodically test disinfectant products containing peracetic acid with a test strip to monitor concentration levels. The use of test strips to monitor peracetic acid levels is relatively simple and quick. Unfortunately, however, test strip analysis can be influenced by the presence of other oxidizers and components in the solution, especially the presence of a peroxide. Thus, peracetic acid test strips can show an inaccurate result when peroxides are present in the disinfectant product. Inaccurate results can lead to the use of a disinfectant product not containing sufficient amounts of peracetic acid to disinfect and/or sterilize a surface or object. These errors are particularly problematic when the disinfectant product is being used in the healthcare field, such as in a hospital environment.

Thus, a method and system are needed for accurately testing peracetic acid levels in disinfectant solutions that contain other components, such as other oxidizers. The present disclosure is directed to a method and kit for inhibiting or preventing interference from other oxidizers, such as peroxides, when testing peracetic acid levels in disinfectant products.

SUMMARY

In general, the present disclosure is directed to a method and kit for determining levels of an oxidant in a disinfectant solution, such as a disinfectant solution for medical devices, in the presence of other components that may cause interference with an accurate reading. In one embodiment, for instance, the present disclosure is directed to a test kit that can accurately determine the concentration levels of peracetic acid in a disinfectant product in the presence of a peroxide or other oxidant. In one embodiment, for instance, a pH buffer system can be used to deactivate high levels of hydrogen peroxide in a disinfectant solution without interfering with active peracetic acid levels in the solution in order to determine the concentration of peracetic acid in the solution accurately and reliably.

In one embodiment, the kit of the present disclosure comprises a pH buffer for adding to a solution containing a peroxide, at least one test strip configured to detect peracetic acid concentration in the solution, and a test vial for combining the solution with the pH buffer prior to contact with the test strip.

The pH buffer of the present disclosure may be configured to maintain the solution in a pH range sufficient to deactivate any peroxides contained within the solution. For example, the pH buffer may be configured to maintain the disinfectant solution within a pH range of from about 3 to about 6, such as from about 4.5 to about 5.5. The pH buffer may be present in an amount sufficient to deactivate a peroxide concentration of about 2% to about 5% in the disinfectant solution. In one embodiment, the pH buffer may comprise an acetate, citrate, phosphate, or phthalate buffer.

In accordance with the present disclosure, the test strip may be configured to detect peracetic acid concentration, such as in a range from 0 to about 0.5% by weight. In one particular embodiment, the test strip and pH buffer present in the kit may be configured to detect peracetic acid concentrations of from 0 to about 500 ppm when the solution contains from about 1% to about 5% by weight of peroxide. In one embodiment, the test strip may comprise a substrate treated with an indicator composition. The indicator composition may contain an indicator combined with a buffer. In a particular embodiment, the indicator may comprise an aromatic amine.

The kit of the present disclosure may further comprise a scale for use with the test strip. The scale indicates peracetic acid concentration based on a change in a characteristic of the test strip after contact with the solution. For example, the scale may comprise a color scale.

In one embodiment, the test vial of the present disclosure may include a plurality of volumetric markings which may indicate the amount of solution to add to the test vial, the amount of diluent to be added to the solution in the test vial, and an amount of pH buffer to add to the solution and the diluent in the test vial. The volumetric markings may be configured such that the volume to volume ratio of the solution to the pH buffer is from about 1.3 to about 1.8, such as from about 1:4 to about 1:6, such as from about 1:4.5 to about 1:5.5. The test vial may be made from a plastic, such as a polypropylene.

The present disclosure is further directed to a method for determining a concentration of peracetic acid in a solution containing a peroxide. The method comprises the steps of placing a sample of the solution into a test vial of the present disclosure, adding the pH buffer of the present disclosure to the solution in the test vial in an amount sufficient to deactivate any peroxides contained within the solution, submerging a test strip of the present disclosure in the solution containing the pH buffer, and determining the amount of peracetic acid concentration in the solution from the test strip. The method may, in one embodiment, further comprise the step of diluting the solution with a diluent, such as water, in addition to combining the solution with the pH buffer.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which:

FIG. 1 is a front surface view of one embodiment of a test strip made in accordance with the present disclosure; and FIG. 2 is an isometric view of one embodiment of a test vial made in accordance with the present disclosure.

Figure 3:
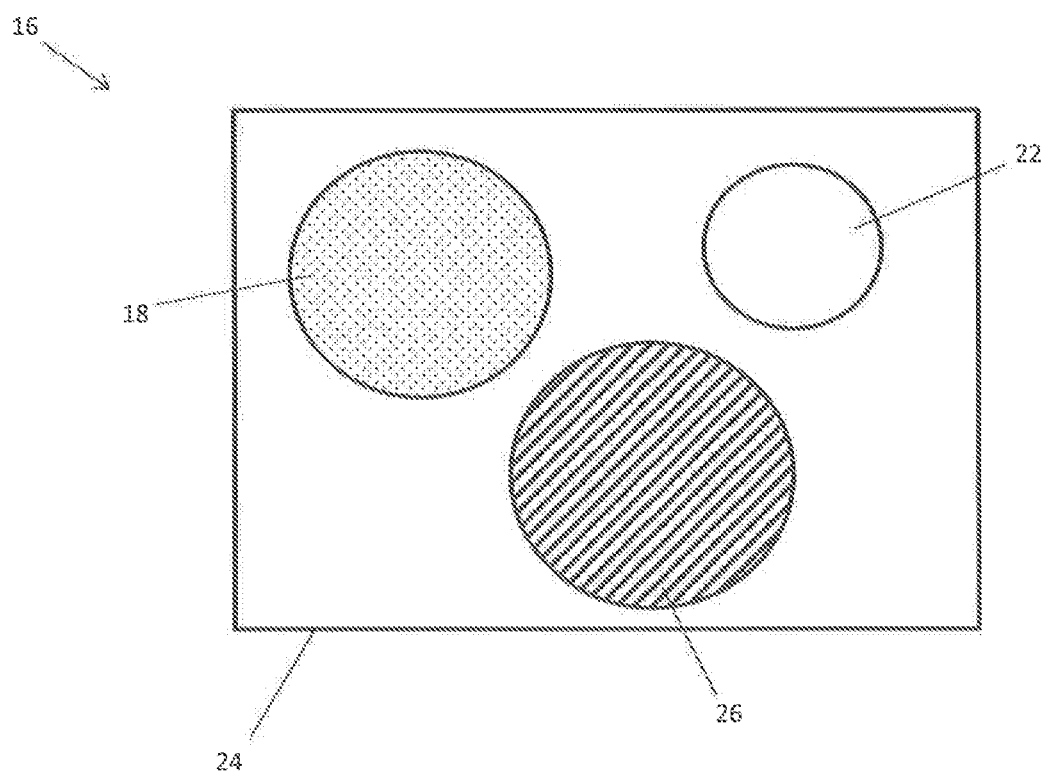
FIG. 3 is a top elevation view of one embodiment of the kit made in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a kit and method that may be used to determine levels of an oxidant, such as a peracid, in a solution in the presence of other components, including peroxides and other oxidants, which may cause interference with an accurate reading of the peracetic acid concentration. In one embodiment of the present disclosure, a pH buffer system can be used to deactivate high levels of oxidants, including hydrogen peroxide, in a disinfectant solution without interfering with active peracetic acid levels in the solution. Thus, the kit and method of the present disclosure can accurately and reliably determine the concentration of peracetic acid in a disinfectant solution containing other oxidants, such as peroxides.

As used herein, "disinfectant solution" includes any solution containing at least one oxidant. The disinfectant solution may optionally contain any disinfectant solution component or additive known in the art, including but not limited to glycols; alcohols; aldehydes; oxidizing agents such as hypochlorites; electrolyzed water; chloramine; chlorine dioxide; iodine; ozone; performic acid; potassium permanganate; potassium peroxymonosulfate; phenolics; quaternary ammonium compounds; silver; other disinfectant and/or antimicrobial agents; surfactants; organic acids; bleaching agents; solvents; builders; cleaning boosters; dyes; and perfumes. Disinfectant solutions of the present disclosure may be in any suitable state, such as liquid, solid, aerosol, slurry, or gel, or form, such as ready-to-use or diluted from concentrate, and may be used for any suitable purpose, including but not limited to disinfection of medical devices, such as endoscopes, hospital, household, and food preparation surfaces, and the like.

As used herein, "oxidant" or "oxidants" comprise oxidizing agents including but not limited to peroxides. Peroxides include any compound, including peroxide and superoxide ions, having at least one O—O bond. Examples of peroxides include but are not limited to potassium peroxydisulfate, peroxymonosulfate, peroxydisulphonic acid, hydrogen peroxide and derivatives thereof, e.g. potassium and sodium perborates, carbamide peroxide (also known as urea hydrogen peroxide), and combinations thereof.

As used herein, "peracid" or "peracids" include any compound having an acidic —OOH group. Examples of peracids include peroxyformic acid, peroxyphthalic acid, peroxybenzoic acid, peroxypropionic acid, peroxyfuroic acid, perbutyric acid, and peracetic acid. As used herein, "peracetic acid," also known as peroxyacetic acid, includes the compound (I):

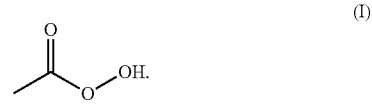

In accordance with the present disclosure, in one embodiment the disinfectant solution contains peracetic acid and at least one other peroxide. The peracetic acid may be present in the disinfectant solution in a concentration of from 0 to about 20,000 ppm, such as from 0 to about 10,000 ppm, such as from 0 to about 5,000 ppm, such as from 0 to about 2,500 ppm, such as from 0 to about 1,000 ppm, such as from 0 to about 500 ppm, such as from 0 to about 250 ppm. The at least one other peroxide may be present in the disinfectant solution in a concentration of from about 0 to about 20%, such as from about 0.1% to about 10%, such as from about 1% to about 8%, such as from about 2% to about 5% by weight. In one particular embodiment, the solution may comprise from 0 to about 0.5% by weight of peracetic acid and from about 1% to about 5% by weight of a peroxide.

The present disclosure is directed to a kit for accurately determining the concentration levels of peracetic acid in a solution in the presence of another oxidant, such as a peroxide. In particular, the test kit of the present disclosure comprises a pH buffer, at least one test strip, and a test vial. In one embodiment, the test kit, when testing peracetic acid levels in disinfectant products, may inhibit or prevent interference from other oxidizers, such as peroxides, without interfering with active peracetic acid levels in the solution.

In accordance with the present disclosure, the test kit contains a pH buffer for adding to a solution. The pH buffer is configured to maintain the solution in a pH range sufficient to deactivate any peroxides contained within the solution without interfering with active peracetic acid levels in the solution. The buffer may be chosen such that it maintains a pH range from about 2 to about 10, such as from about 3 to about 9, such as from about 4 to about 8, such as from about 5 to about 7. The identity of the buffer is not particularly limited. For example, the buffer used herein may be any suitable buffer, including but not limited to hydrochloric acid, polycarboxylic acids, such as citric acid, succinic acid, lactic acid, tartaric acid, formic acid, malonic acid, and ketoglutaric acid; phosphates, such as sodium phosphate; borates; chlorates; acetates, such as acetic acid and sodium acetate; citrates; phthalates; carbonates, such as sodium carbonate and sodium bicarbonate; and mixtures thereof. In one embodiment, the buffer used herein may be configured so that it does not interfere with measurement of peracetic acid concentration within a solution. In fact, the buffer may improve in at least one respect the measurement of peracetic acid concentration within a solution.

In one embodiment, the pH buffer of the present disclosure may comprise a citrate buffer comprising citric acid monohydrate solution and trisodium citrate dihydrate. In one particular embodiment, the citrate buffer may comprise from about 20 to about 50 mL of 0.25M citric acid monohydrate solution and from about 50 to about 80 mL of 0.25M trisodium citrate dehydrate. The citrate buffer may have a pH of 5.

In another embodiment, the pH buffer of the present disclosure may comprise a phthalate buffer comprising potassium hydrogen phthalate and sodium hydrogen. In one particular embodiment, the phthalate buffer may comprise from about 85 to about 115 mL of 0.25M potassium hydrogen phthalate and from about 30 to about 60 mL of 0.25M sodium hydrogen. The phthalate buffer may have a pH of 5.

In yet another embodiment, the pH buffer of the present disclosure may comprise a citric acid-phosphate buffer comprising citric acid monohydrate solution and sodium phosphate dibasic solution. In one particular embodiment, the phthalate buffer may comprise from about 30 to about 60 mL of 0.25M citric acid monohydrate solution and from about 30 to about 60 mL of 0.50M sodium phosphate dibasic solution. The citric acid-phosphate buffer may have a pH of 5.

In one embodiment, the pH buffer may be ready-to-use, that is, may not require dilution. In another embodiment, the buffer may be in a concentrated form and thus may require dilution prior to use. In yet another embodiment, the buffer may be in a solid form, such as in a tablet or powder, and thus must be dispersed in a carrier, such as water or an organic or inorganic solvent, prior to use.

In accordance with the present disclosure, the test kit contains at least one test strip. The test strip may be configured to detect peracetic acid concentration in a solution. As illustrated in FIG. 1, in one embodiment of the present disclosure, the test strip 10 may comprise a substrate 12 and an indicator composition 14. The substrate 12 of the test strip may be of any shape or size and may be formed of any suitable material. For example, in one embodiment, the substrate may comprise a flat, thin sheet-like material. In accordance with the present disclosure, the substrate may comprise a bibulous material, such as filter paper, sponge materials, cellulose, wood, woven and nonwoven fabrics, and combinations thereof, or a nonbibulous material, such as a glass fiber, polymeric films, microporous membranes, and combinations thereof. Suitable substrates include but are not limited to hydrophilic inorganic powders, such as silica gel, alumina, diatomaceous earth and the like; argillaceous substances; cloth; hydrophilic natural polymeric materials, particularly cellulosic material, like cellulose beads, and especially fiber-containing papers such as filter paper or chromatographic paper; synthetic or modified naturally occurring polymers, such as cellulose acetate, polyvinyl chloride, polyacrylamide, polyacrylates, polyurethanes, crosslinked dextran, agarose, other such crosslinked and noncrosslinked water-insoluble hydrophilic polymers, and combinations thereof. The substrate can vary in regards to smoothness and roughness combined with hardness and softness. In one embodiment, the substrate material may be chosen such that the substrate maintains its structural integrity when exposed to disinfectant solution or other fluids. In one particular embodiment, the substrate is constructed from filter paper or polymeric films.

In one embodiment, the test strip may further contain an indicator composition. The indicator composition may comprise an indicator. In an alternate embodiment, the indicator may be present in or on the test strip independent of an indicator composition. In one embodiment, the indicator and/or indicator composition may experience a characteristic change after contact with a solution and can thus indicate the presence and/or concentration of a substance in a solution.

In accordance with the present disclosure, the indicator may comprise a chromagen or an iodide or iodide salt, such as potassium iodide, sodium iodide, lithium iodide, and/or ammonium iodide and the like. In one embodiment, the chromagen may be chosen from those known to be oxidized in the presence of peroxides, particularly those known to be oxidized in the presence of peracids. For example, suitable chromagens include but are not limited to aromatic amines, benzidine and derivatives thereof, phenols, and/or leuko dyestuffs. In one particular embodiment, the indicator may comprise an aromatic amine. In accordance with the present disclosure, the indicator may be present in the indicator composition in an amount from about 0.1% to about 10%, such as from 1% to 5%, by weight of the indicator composition.

In one embodiment, the indicator composition may further comprise a buffer. The buffer may be chosen such that it maintains the indicator composition within a pH from about 2 to about 10, such as from about 3 to about 9, such as from about 4 to about 8, such as from about 5 to about 7. The buffer used herein may be any suitable buffer, including but not limited to hydrochloric acid, polycarboxylic acids, such as citric acid, succinic acid, lactic acid, tartaric acid, formic acid, malonic acid, and ketoglutaric acid; phosphates, such as sodium phosphate; borates; chlorates; acetates, such as acetic acid and sodium acetate; citrates; phthalates; carbonates, such as sodium carbonate and sodium bicarbonate; and mixtures thereof. The buffer may be present in the indicator composition in an amount from about 1% to 30%, such as from 2% to 15% by weight. In a particular embodiment, the indicator composition buffer may be chosen such that it does not interfere with the detection of peracetic acid. In fact, the indicator composition buffer may improve the detection of peracetic acid in at least one respect.

The indicator composition may further contain a variety of optional ingredients. For example, in one embodiment, the indicator composition may optionally comprise a polymer, such as a water-soluble polymer. In another embodiment, the indicator composition may optionally contain a surfactant, such as an anionic or nonionic surfactant. The optional surfactant may be chosen from any known surfactant, including but not limited to an othoxylated polysorbate, an ethoxylated alcohol, an ethoxylated phenol, a polyethylene glycol, a polypropylene glycol, an ethylene glycol-propylene glycol copolymer, a polybutylene glycol, alkyl sulfates, alkyl ether sulfates, alkyl ether sulfonates, sulfate esters of an alkylphenoxy polyoxyethylene ethanol, alpha-olefin sulfonates, beta-alkyloxy alkane sulfonates, alkyl arylsulfonates, alkyl carbonates, alkyl ether carboxylates, fatty acids, sulfosuccinates, alkyl ether sulfosuccinates, sarcosinates, octoxynol phosphates, nonoxynol phosphates, taurates, fatty taurides, sulfated monoglycerides, fatty acid amido polyoxyethylene sulfates, isothienates; ammonium, monoethanolamine, diethanolamine, triethanolamine, isopropylamine, sodium, potassium, lithium, or magnesium salts of lauryl sulfate, dodecylbenzenesulfonate, lauryl sulfosuccinate, lauryl ether sulfate, lauryl ether carboxylate, lauryl phosphate, lauryl sarcosinate, cocomethyl tauride, and sulfosuccinate half ester amide dodecylsulfonate salt, a cholate salt, a $C_8$ to $C_{18}$ fatty acid; or mixtures thereof. In one embodiment, the optional surfactant may be present in the indicator composition in an amount from 0% to about 2%, such as from about 0.1% to about 1.5% by weight.

In one embodiment, the indicator composition may further comprise a carrier. The carrier may comprise water, inorganic solvents, and/or organic solvents such as acetone, methanol, ethanol, isopropyl alcohol, ethylene glycol, propylene glycol, dimethylformamide, dimethylsulfoxide, acetonitrile, ethyl acetate, and the like. The carrier may be present in the indicator composition in an amount from 0% to about 90%, such as from about 10% to about 70% by weight of the carrier.

In one embodiment of the test strip of the present disclosure, as illustrated in FIG. 1, a portion of the substrate 12 may be treated or impregnated with indicator composition 14. In an alternate embodiment, however, the indicator composition 14 may be present on or in substantially the entire substrate 12.

The indicator composition may be applied to or incorporated into the substrate in any known manner. In one embodiment, the indicator composition may be applied as a coating to the substrate or portion thereof. In an alternate embodiment, the indicator composition may be incorporated into the substrate or portion thereof. As used herein, "incorporated" includes impregnating the substrate or a portion thereof with the indicator composition and then drying. For example, the substrate or a portion thereof may be saturated or impregnated with an aqueous indicator composition by immersing or by spraying the aqueous solution onto sheets or precut strips of pads of the substrate. The term "incorporated" also includes mixing the indicator composition with a liquid substrate material, casting the mixture as a film, and then drying to form the substrate.

In one embodiment of the present disclosure, the indicator composition does not interfere with the detection of peracetic acid, nor does it detrimentally affect properties of the test strip substrate, such as absorbency and stiffness. In fact, in one embodiment, the indicator composition may enable and/or improve the detection of peracetic acid and/or improve the properties of the test strip in at least one respect.

In one embodiment of the present disclosure, the test strip may be contacted with a solution containing an oxidant, in particular peracetic acid, in order to measure the concentration of the oxidant in the solution. This contact may occur in any manner. For example, in one embodiment, the test strip or a portion thereof may be dipped into the solution. For instance, in one particular embodiment only the terminal end of the test strip is immersed in the solution. Alternately, the solution may be applied to the test strip dropwise, such as with a pipette or dropper.

In accordance with the present disclosure, in one embodiment, the test strip or a component or portion thereof may experience a characteristic change after contact with a solution. For example, the substrate and/or the indicator composition of the test strip may be capable of interacting with an oxidant in the solution, such as peracetic acid, to produce a detectable and measurable response based on the concentration of that oxidant. In one embodiment, the response may be such that the concentration of the oxidant can be determined without the use of instruments; instead, the oxidant concentration may be determined with simple visual observation. However, if desired, instruments, such as spectrophotometers or colorimeters, may be used to measure the oxidant concentration and/or measure the difference in response between the test sample and a solution having a known concentration of oxidant.

In one embodiment, the test strip may undergo a color change after contact with a solution. As used herein, "color change" includes any change in shade, hue, tint, intensity, or absolute color. For example, after contact with the solution, the test strip may undergo an absolute color change, such as from white to black, from black to white, from green to yellow, from yellow to blue, from red to yellow, from blue to green, from green to red, from pink to red, and the like. In an alternate embodiment, the test strip may undergo a shade change, such as from light green to dark green, after contact with a solution.

In one particular embodiment, the test strip may undergo a color or shade change upon contact with a solution that has a threshold or minimum concentration of an oxidant in solution. In this embodiment, the test strip will experience little to no color change unless contacted with a solution having the minimum oxidant concentration.

In another embodiment, upon contacting a solution, the test strip may undergo different color changes that reflect the different concentrations of an oxidant in the solution. For example, in one embodiment, the test strip may undergo a change from an initial color to a second color, wherein the second color corresponds to a particular concentration of peracetic acid. In one embodiment, this color change may occur on a gradient such that a progressive change in color corresponds to a progressive increase or decrease in peracetic acid concentration in the measured solution. For instance, the intensity of the color change of the test strip may increase with increasing concentrations of peracetic acid. In one particular embodiment, for example, the test strip may change from white to a shade of green, with lighter shades of green indicator a lower peracetic acid concentration and darker shades of green correlating to higher peracetic acid concentrations.

In one embodiment, the test kit may further comprise a scale, chart, or written directions for use with the test strip. The scale, chart, or written directions may indicate the peracetic acid concentration based on a change in a characteristic of the test strip after contact with the solution. In one embodiment, the test kit may comprise a scale, for instance, a color scale. In this embodiment, a change in color of the test strip after contact with the solution may correlate to a peracetic acid concentration specified by the color scale. In particular embodiment, the test strip and scale may have sufficient sensitivity and sufficient visual color resolution to allow differentiation between, and the quantitative measurement of, test samples having different oxidant concentrations.

In accordance with the present disclosure, the test strip may be configured to detect peracetic acid concentration in solution in a range of from 0 to about 20%, such as from 0 to about 10%, such as from 0 to about 5%, such as from 0 to about 2%, such as from 0 to about 1%, such as from 0 to about 0.5% by weight, such as from 0 to about 0.25% by weight, such as from 0 to about 0.10% by weight.

Other modifications may be made to the test strips described herein. For example, in one embodiment, the test strip may be designed as a single or multi piece test strip. In another embodiment, the test strip may include a support strip or handle for the user to touch or hold while using the test strip.

Test strips made in accordance with the present disclosure are commercially available as LaMott 3000 PAA, Indigo PAA, Macherey-Nagel QUANTOFIX® Peracetic acid 50, 500, 1000, and 2000, and Micro Essential Hydrion® PAA test strips. In one embodiment, the Macherey-Nagel QUANTOFIX® Peracetic acid 500 test strips are particularly preferred.

The test kit of the present disclosure further comprises a test vial for combining the solution with the pH buffer prior to contact with the test strip. The test vial may have a volume sufficient to contain an amount of solution, such as a disinfectant solution; an amount of a diluent; and an amount of pH buffer. As used herein, "diluent" includes but is not limited to water and organic and inorganic solvents. The diluent may be provided in the test kit or may be acquired from an source outside of the test kit. In one non-limiting embodiment, the test vial may have a volume of about 1,000 mL or less, such as about 750 mL or less, such as about 500 mL or less, such as about 250 mL or less, such as about 100 mL or less, such as about 50 mL or less, such as about 25 mL or less, such as about 15 mL or less, such as about 5 mL or less, such as about 1 mL or less.

Referencing FIG. 2, in one embodiment of the present disclosure, the test vial 26 may comprise a container 27, and optionally, a top 28 and a base 29. The shape and material of the test vial container 27 and optional top 28 and base 29 are non-limited and may be chosen based on a particular use or application. For example, in one embodiment, the test vial components may be formed from a plastic, such as a polypropylene or a polyethylene. In one embodiment, the top 28 may comprise a cap or lid which may seal the opening at the top of the test vial container 27 to reduce and/or prevent leakage or spillage of solutions contained therein. In another embodiment, the base 29 may stabilize the test vial container 27, reducing and/or preventing leakage or spillage of solutions contained therein.

As illustrated in FIG. 2, in one embodiment the test vial 27 may comprise a plurality of volumetric markings 30, 32, and 34. These markings may indicate the volume of each kit constituent and/or diluent to add to the test vial. In one particular embodiment, the first marking 30 may indicate the amount of solution to add to the test vial while the second marking 32 may indicate the amount of diluent to be added to the solution in the test vial. The third marking 34 may indicate the amount of pH buffer to add to the solution and the diluent in the test vial.

In accordance with the present disclosure, the volumetric markings may assume any suitable form, shape, size, or location. For example, though the volumetric markings of the test vial of FIG. 2 are represented as lines horizontally extended across the test vial container 27, in alternate embodiments, the markings may comprise dashes or marks arranged vertically or horizontally. In addition, the volumetric markings may be formed on the internal and/or external surface of the test container 27 in any suitable manner. For example, the volumetric markings may be directly engraved, embossed, or etched into the test vial container. Alternately, the volumetric markings may be printed on the container or applied in the form of an adhesive label.

In accordance with the present disclosure, the volumetric markings may be vertically spaced apart on the test vial at any suitable uniform or varying distance. In one particular embodiment, the volumetric markings may be located on the test vial such that when the solution and pH buffer are added in the amounts designated by the volumetric markings, the volume to volume ratio of the solution to the pH buffer is from about 1:1 to about 1:10, such as from about 1:3 to about 1:8, such as from about 1:4 to about 1:6, such as from about 1:4.5 to about 1:5.5. For example, in one embodiment, the pH buffer may be present in the test vial in an amount greater than about 1 mL, such as greater than about 2 mL, such as greater than about 5 mL, such as greater than about 10 mL, such as greater than about 20 mL, such as greater than about 50 mL, such as greater than about 100 mL, such as greater than about 500 mL, such as greater than about 1,000 mL, while the solution may be present in the test vial in an amount less than about 1,000 mL, such as less than about 500 mL, such as less than about 100 mL, such as less than about 75 mL, such as less than about 50 mL, such as less than about 25 mL, such as less than about 15 mL, such as less than about 10 mL, such as less than about 5 mL, such as less than about 2.5 mL, such as less than about 1 mL. For instance, in one particular embodiment, the test vial may contain about 5 mL of solution and about 25 mL of pH buffer.

In accordance with the present disclosure, the pH buffer, test strip, and test vial described herein are components of a test kit for determining a concentration of peracetic acid in a solution containing a peroxide. In one embodiment, the test kit of the present disclosure can be used to deactivate high levels of peroxides in a disinfectant solution without interfering with active peracetic acid levels in the solution, thus providing an accurate and reliable determination of the concentration of peracetic acid in the disinfectant solution.

Referring to FIG. 3, one embodiment of a test kit in accordance with the present disclosure is shown. Like reference numerals have been used in order to indicate similar elements. The test kit 16 comprises at least one test vial 26, a pH buffer, and at least one test strip. The pH buffer may be placed into the body of the buffer container 18. In one embodiment, the at least one test strip may be placed in the kit without further packaging. Alternately, as illustrated in FIG. 3, in one embodiment the at least one test strip may be placed into the body of test strip container 22. In one embodiment, the test strip container 22 may be lined with a metal such as aluminum. The test kit 16 may further comprise optional outer package 24 that can hold the components of the test kit.

In accordance with the present invention, the test vial 26, buffer container 18, test strip container 22, and outer package 24 may be formed from any suitable containment device, including but not limited to containers, flasks, vials, test tubes, boxes, bags, pouches, and the like. In one embodiment, the test vial 26, buffer container 18, and test strip container 22 may be prefilled with predetermined amounts of their respective components. Generally, the containers may have a volume of about 1 mL to about 1,000 mL, such as from about 5 mL to about 500 mL, such as from about 10 mL to about 100 mL. In one embodiment, the test strip container 22 may contain one or more test strips, such as from about 1 to about 500 test strips, such as from about 5 to about 250 test strips, such as from about 25 to about 100 test strips. In one embodiment, one or more of the vial, package, and containers will have a removable top, cap, or stopper to retain their components during shipping and during use.

In one embodiment, the test kit may further comprise a scale, chart, or written directions printed or located on the outer package 24, buffer container 18, test strip container 22, or test vial 26. Alternately, the scale, chart, or written directions may be located on a separate insert which may be placed in the outer package 24, along with the other test kit components.

The present disclosure is further directed to a method for accurately determining the concentration levels of peracetic acid in a solution in the presence of another oxidant, such as a peroxide. The solution may comprise a disinfectant solution as described above, such as a disinfectant solution used for medical devices. In one embodiment, for instance, a pH buffer system can be used to deactivate high levels of hydrogen peroxide in a disinfectant solution without interfering with active peracetic acid levels in the solution in order to determine the concentration of peracetic acid in the solution accurately and reliably. In one embodiment, the test kit as described herein may be used in a method for measuring peracetic acid levels in a solution.

In accordance with the present disclosure, the method comprises the steps of placing a sample of the solution into a test vial, adding a pH buffer to the solution in the test vial in an amount sufficient to deactivate any peroxides contained within the solution, submerging a test strip in the solution containing the pH buffer, the test strip being configured to detect peracetic acid concentration in the solution, and determining the amount of peracetic acid concentration in the solution from the test strip. The test vial, pH buffer, and test strip used in the method are described above.

In one embodiment, the method further comprises the step of diluting the solution with a diluent, such as water, inorganic, and/or organic solvents, in addition to combining the solution with the pH buffer.

In accordance with the present disclosure, in one embodiment the pH buffer may be added to the solution in an amount sufficient for the solution to maintain a pH of from about 3 to about 6, such as from about 4.5 to about 5.5. In one embodiment, the pH buffer may be added to the solution in an amount such that the volume to volume ratio of the solution to the buffer once mixed together is from about 1:3 to about 1:8, such as from about 1:4 to about 1:6, such as from about 1:4.5 to about 1:5.5.

The present disclosure may be better understood with reference to the following examples.

EXAMPLES

A test kit was formulated according to the present disclosure and tested for accuracy in measuring peracetic acid concentration in samples containing peracetic acid and hydrogen peroxide. For the testing procedure, a portion of the liquid sample solution was transferred into a test tube and subsequently diluted with water. The sample was further diluted with pH buffer. The test strip was then used to determine the peracetic acid concentration in the diluted sample. The results in Table 1 below illustrate that the peracetic acid concentrations measured by test strips are comparable to the peracetic acid concentrations measured via the traditional non-aqueous thiosulfate titration method.

TABLE 1

Concentrations of peracetic acid measured by peracetic acid test strips and a titration method

| Test Sample | Test Method | Peracetic Acid | | |
| --- | --- | --- | --- | --- |
| | | 1 hour | 6 hour | 24 hour |
| Disinfectant solution with 0.12% peracetic acid and 2% hydrogen peroxide | Titration | 0.124 | 0.126 | 0.125 |
| | Test strip | 0.12 | 0.12 | 0.12 |
| Disinfectant solution with 0.18% peracetic acid and 3% hydrogen peroxide | Titration | 0.184 | 0.185 | 0.178 |
| | Test strip | 0.18 | 0.18 | 0.18 |

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A method for determining a concentration of peracetic acid in a solution containing a peroxide comprising:

placing a sample of the solution into a test vial;

adding a pH buffer to the solution in the test vial in an amount sufficient to maintain a pH of from about 3 to 6, wherein a volume to volume ratio of the solution to the buffer once mixed together is from about 1:3 to about 1:8;

and deactivate any peroxides contained within the solution without interfering with active peracetic acid levels in the solution; wherein the solution contains from about 1% to about 5% by weight of a peroxide;

submerging a test strip in the solution containing the pH buffer, the test strip being configured to detect peracetic acid concentration in the solution; and determining an amount of peracetic acid concentration in the solution from the test strip.

2. A method as defined in claim 1, wherein the pH buffer is added to the solution in an amount sufficient for the solution to maintain a pH of from about 4.5 to about 5.5.

3. A method as defined in claim 1, wherein the pH buffer comprises an acetate buffer, a citrate buffer, a phosphate buffer, or a phthalate buffer.

4. A method as defined in claim 1, wherein the test strip contains an indicator comprising an aromatic amine.

5. A method as defined in claim 1, wherein the test strip undergoes a color change upon contacting a peracetic acid solution.

6. A method as defined in claim 5, further comprising the step of using a color scale to determine the concentration of peracetic acid in the solution.

7. A method as defined in claim 1, wherein the solution contains peracetic acid in an amount from about 0 to about 0.5% by weight.

8. A method as defined in claim 1, further comprising the step of diluting the solution with water in addition to combining the solution with the pH buffer.

9. A method as defined in claim 1, wherein the solution comprises a disinfectant solution for medical devices.

* * * * *